United States Patent [19]
Martin et al.

[11] Patent Number: 5,440,201
[45] Date of Patent: Aug. 8, 1995

[54] PLASMA ADDRESSING STRUCTURE WITH WIDE OR TRANSPARENT REFERENCE ELECTRODE

[75] Inventors: Paul C. Martin, Vancouver, Wash.; Thomas S. Buzak, Aloha, Oreg.

[73] Assignee: Tektronix, Inc., Wilsonville, Oreg.

[21] Appl. No.: 285,586

[22] Filed: Aug. 3, 1994

Related U.S. Application Data

[63] Continuation of Ser. No. 936,194, Aug. 26, 1992, abandoned.

[51] Int. Cl.$^6$ ............................................. H01J 17/49
[52] U.S. Cl. ................................... 313/582; 313/584; 313/585; 315/169.4; 345/60
[58] Field of Search ............... 313/505, 582, 584, 585, 313/306, 308, 581, 586; 315/169.4; 345/60

[56] References Cited

U.S. PATENT DOCUMENTS

| | | | |
|---|---|---|---|
| 3,262,010 | 7/1966 | Kazan | 315/63 |
| 3,812,486 | 5/1974 | Purchase | 340/324 M |
| 4,038,577 | 7/1977 | Bode et al. | 313/188 |
| 4,081,715 | 3/1978 | Uemura | 315/167 |
| 4,322,659 | 3/1982 | De Jule et al. | 315/169.1 |
| 4,352,101 | 9/1982 | De Jule | 340/769 |
| 4,896,149 | 1/1990 | Buzak et al. | 340/794 |
| 4,963,788 | 10/1990 | King et al. | 313/505 |
| 5,107,182 | 4/1992 | Sano et al. | 315/169.4 |
| 5,214,521 | 5/1993 | Kwon et al. | 359/54 |
| 5,221,979 | 6/1993 | Kim | 359/54 |
| 5,233,272 | 8/1993 | Whang et al. | 315/169.4 |

FOREIGN PATENT DOCUMENTS

| | | | |
|---|---|---|---|
| 61-176035 | 8/1986 | Japan | 345/60 |
| 495331 | 3/1992 | Japan | 313/582 |

OTHER PUBLICATIONS

Thomas S. Buzak, Switching Pixels With Gas, Oct. 1990, Information Display, pp. 7-9,14 vol. 6, No. 10.
Mikoshiba, Shigeo, "Plasma Displays," Seminar 10, SID 1987, 10.2-10.37.
Dick, George W., "Plasma Display Panel Techniques," Seminar 2, SID 1985, 2.2-2-2.2-54.

*Primary Examiner*—Anita Pellman Gross
*Assistant Examiner*—Walter J. Malinowski
*Attorney, Agent, or Firm*—Mark M. Meininger; John D. Winkelman

[57] ABSTRACT

A plasma addressing structure (52) having an ionizable gas captured within each of multiple parallel channels (62a) extending across a display screen (54) includes an arrangement (132a) of anodes (112a) and cathodes (114a) for selectively ionizing the gas to address data elements. The anode in each channel has an extended width (130a) in a direction transverse to the length of the channel, thereby to provide the channel with a relatively large conductive surface area that facilitates the ionization of the gas contained in the channel. The large conductive surface provided by the extended width of the anode allows each channel to be formed with a shallow depth (118a) that enhances the viewing angle characteristics of the display screen and simplifies the manufacture of the addressing structure.

20 Claims, 5 Drawing Sheets

PLASMA ADDRESSING STRUCTURE WITH WIDE OR TRANSPARENT REFERENCE ELECTRODE

This is a continuation of application Ser. No. 07/936,194 filed Aug. 26, 1992 which is now abandoned.

TECHNICAL FIELD

The present invention relates to plasma addressing structures having an anode and a cathode for selectively ionizing a gas to address a data element and, in particular, to the arrangement of the anode and the cathode in such addressing structures.

BACKGROUND OF THE INVENTION

Plasma addressing structures may be employed in a variety of applications including data storage devices, video cameras, and flat panel liquid crystal displays. One such addressing structure is described in U.S. Pat. No. 4,896,149 of Buzak et al. for "Addressing Structure Using Ionizable Gaseous Medium." A preferred embodiment of this addressing structure includes an ionizable gas captured within each of multiple parallel channels extending across a display screen. The gas in each channel is selectively ionized to address a row of display elements aligned with the channel. The gas is ionized by a gas ionizing structure that includes an electrical reference electrode or anode and a data strobe electrode or cathode that extend along the length of each channel.

While the gas in a channel is ionized, data signals are delivered to the addressed display elements on multiple data lines extending perpendicular to the arrangement of channels. A liquid crystal material is responsive to the data signals to form a display image.

Figure 1:
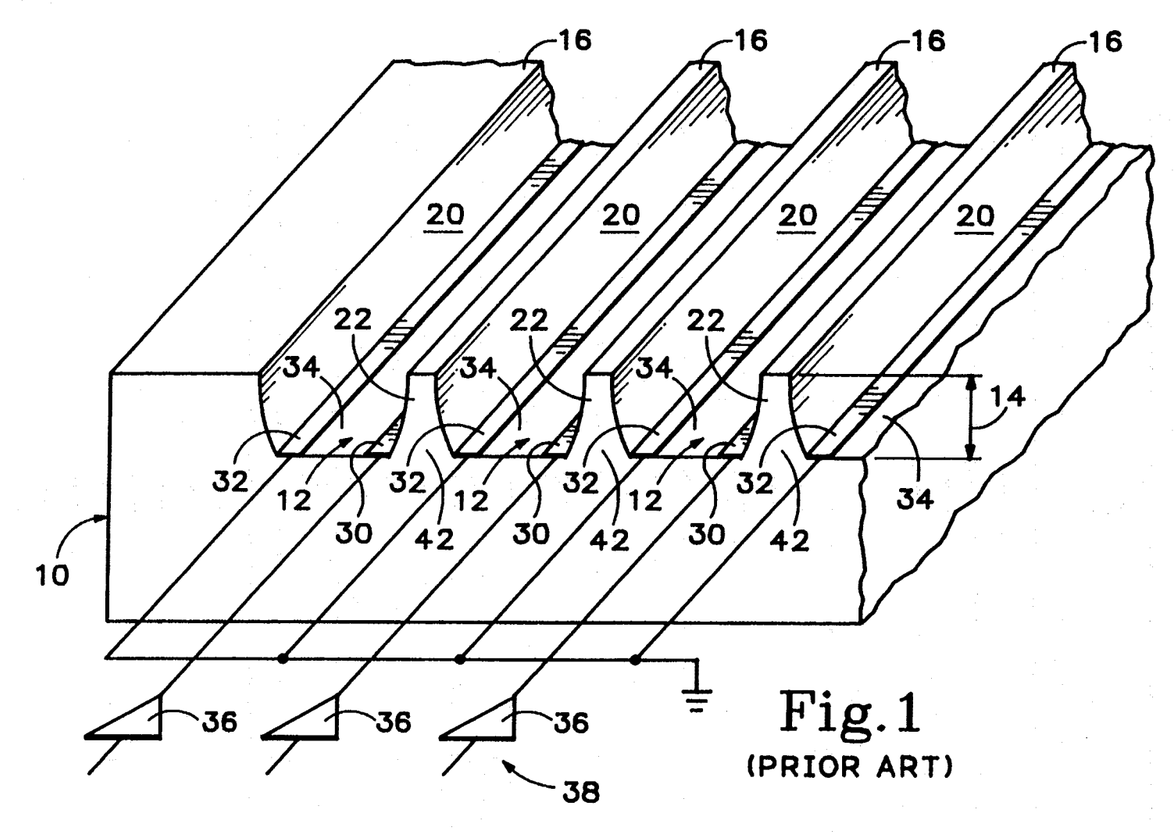
FIG. 1 is an enlarged fragmentary view of a prior art substrate with channels for containing the ionizable gas of a plasma addressing structure.

FIG. 1 is an elevated fragmentary view of a prior art glass substrate 10 within which multiple parallel channels 12 are inscribed for containing an ionizable gas. Each channel 12 has a generally semicircular cross section and a depth 14 measured from a top surface 16 of substrate 10. Adjacent channels 12 are separated by sidewalls 20 that define multiple support structures 22 with top surfaces 16 that support a liquid crystal material and other components (not shown).

A strobed row electrode or cathode 30 and a grounded reference electrode or anode 32 are positioned on a bottom surface 34 of each channel 12. Cathodes 30 and anodes 32 are relatively thin, narrow metal coatings covering less than about 35% of bottom surface 34, or about 25% of the interior surface of channels 12. Each of cathodes 30 receives a row strobe signal from a corresponding output amplifier 36 of a data strobe circuit 38 for selectively ionizing a gas contained within the channel 12.

Channels 12 have relatively large depths 14 of about 0.152 mm, which is about one-third the channel width 40. All surfaces abutting channels 12 other than cathodes 30 and anodes 32 are nonconductive and tend to quench the ionization of the gas. However, the relatively large depths 14 of channels 12 accommodate correspondingly large volumes of gas that overcome the quenching effects of the nonconductive surfaces. Specifically, the volume of gas increases as the third power of the channel dimensions, and the area of abutting surfaces increases as the second power of the channel dimensions. A larger volume of ionized gas is, therefore, capable of overcoming the quenching effects because the nonconductive surface is proportionally smaller.

A consequence of the large depths 14 of channels 12 is that substrate 10 is relatively difficult to manufacture with an acceptable yield. Moreover, the generally semicircular cross section of deep channels 12 forms support structures 22 with relatively broad bases 42. In display systems, such support structures 22 form relatively wide black bands between the image lines formed on the display screen. Such support structures 22 also reduce the range of off-axis viewing angles from which the display screen may be viewed.

SUMMARY OF THE INVENTION

An object of the present invention is, therefore, to provide an arrangement of anodes and cathodes in a plasma addressing structure.

Another object of this invention is to provide such an arrangement that allows the manufacture of a plasma addressing structure with relatively shallow gas-containing channels.

A further object of this invention is to provide such an arrangement that facilitates the ionization of gases contained in shallow channels.

The present invention is an arrangement of anodes and cathodes in a plasma addressing structure. In a preferred embodiment, the plasma addressing structure includes an ionizable gas captured within each of multiple parallel channels extending across a display screen. The gas in each channel is selectively ionized to address display elements aligned with the channel.

The gas is ionized by a gas ionizing structure that includes an electrical reference electrode or anode and a data strobe electrode or cathode of the present invention. A cathode and an anode extend along the length of each channel and selectively effect ionization of the gas in accordance with the signals delivered to the cathode.

Each channel has a shallow depth that enhances the viewing angle characteristics and manufacturability of the display screen. The anode in each channel has an extended width in a direction transverse to the length of the channel, thereby to provide the channel with a relatively large conductive surface area that facilitates the ionization of the gas contained in the channels. The large conductive surface provided by the extended width of the anode reduces the quenching of the gas ionization characteristic of shallow channels.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 2:
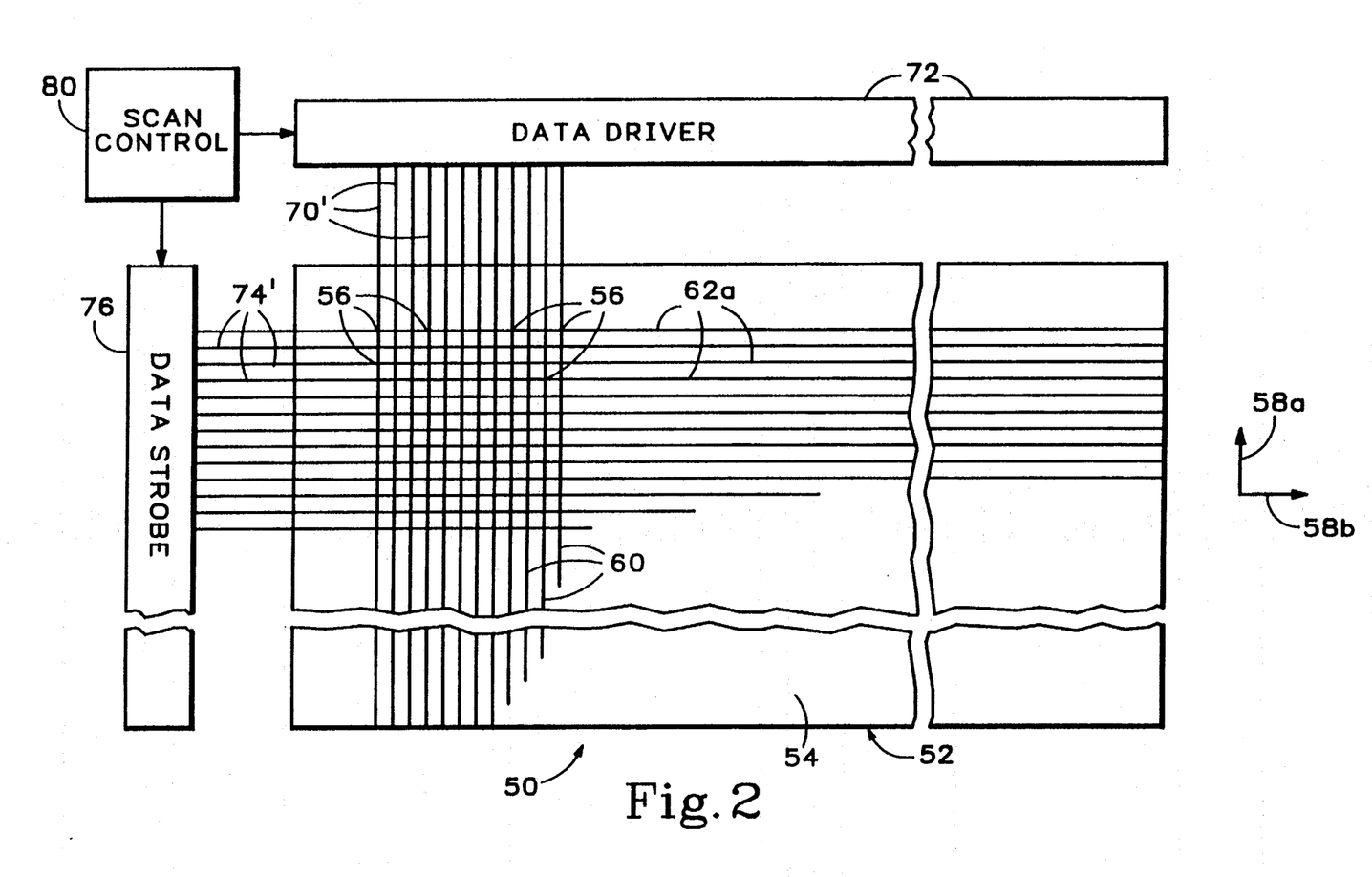
FIG. 2 is a front view of a display panel and associated drive circuitry of a display system incorporating the apparatus of the present invention.

FIG. 2 shows a flat panel display system 50 having an addressing structure functioning as a display panel 52 with a display surface 54. A rectangular planar array of nominally identical data storage or display elements 56 are mutually spaced apart by predetermined distances in vertical and horizontal directions 58a and 58b, respectively.

Each display element 56 in the array represents the overlapping portions of thin, narrow electrodes 60 arranged in vertical columns and elongate, narrow channels 62a arranged in horizontal rows. (The electrodes 60 are hereinafter referred to as "column electrodes 60.") The row of display elements 56 aligned with each channel 62a represents one line of display data.

Figure 3:
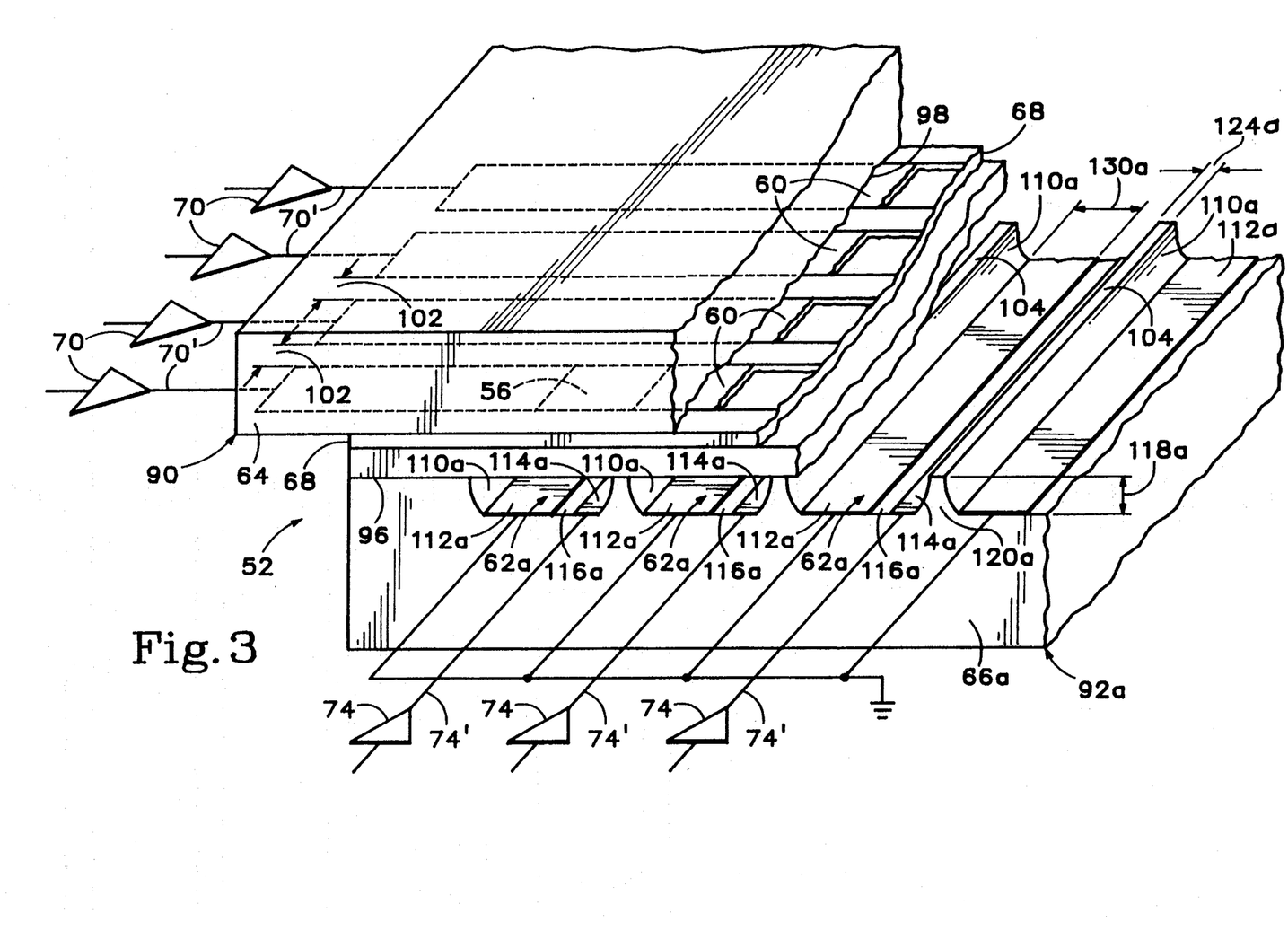
FIG. 3 is an enlarged fragmentary isometric view showing the layers of structural components forming the display panel of FIG. 2.

With reference to FIGS. 2 and 3, the widths of column electrodes 60 and channels 62a determine the dimensions of display elements 56, which are of rectangular shape. As will be further described below, column electrodes 60 are deposited on a major surface of a first electrically nonconductive, optically transparent substrate 64, and channels 62a are inscribed in a major surface of a second electrically nonconductive, optically transparent substrate 66.

A layer 68 of electro-optic material, such as a nematic liquid crystal, is captured between substrates 64 and 66, as described below in greater detail. Skilled persons will appreciate that certain systems, such as a reflective displays of either the direct view or projection type, would require that only one of the substrates be optically transparent.

Column electrodes 60 receive data drive signals of the analog voltage type developed on parallel output conductors 70′ by different ones of the output amplifiers 70 of a data driver or drive means 72, and channels 62a receive data strobe signals of the voltage pulse type developed on parallel output conductors 74′ by different ones of the output amplifiers 74 of a data strobe or strobe means or strobe circuit 76. To synthesize an image on substantially the entire area of display surface 54, display system 50 employs a scan control circuit 80 that coordinates the functions of data driver 72 and data strobe 76 so that all columns of display elements 56 of display panel 52 are addressed row by row in row scan fashion.

Display panel 52 includes a pair of generally parallel electrode structures 90 and 92a spaced apart by layer 68 of electro-optic material and a thin layer 96 of dielectric material, such as glass, mica, or plastic. Electrode structure 90 includes substrate 64 that has deposited on its inner surface 98 column electrodes 60 formed of optically transparent indium tin oxide to form a striped pattern. Adjacent pairs of column electrodes 60 are spaced apart a distance 102, which defines the horizontal space between next adjacent display elements 56 in a row.

Figure 4A:
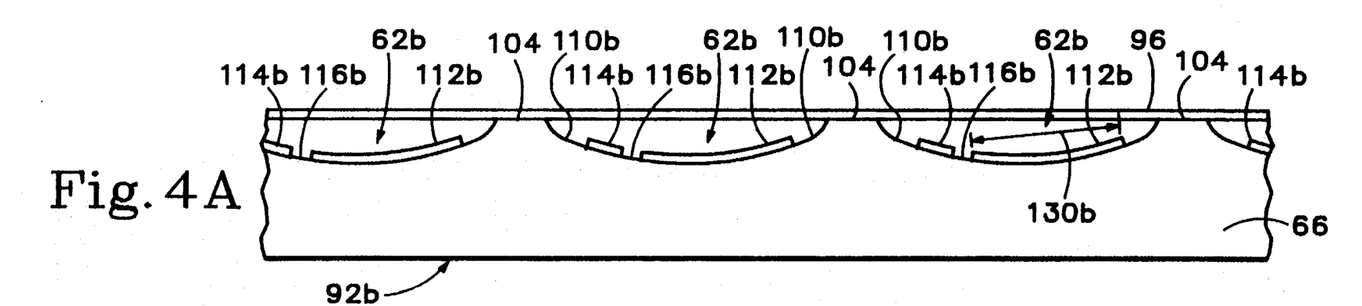
FIGS. 4A, 4B, and 4C are simplified cross sectional side views showing alternative channel and electrode structures of the present invention.
Figure 4B:
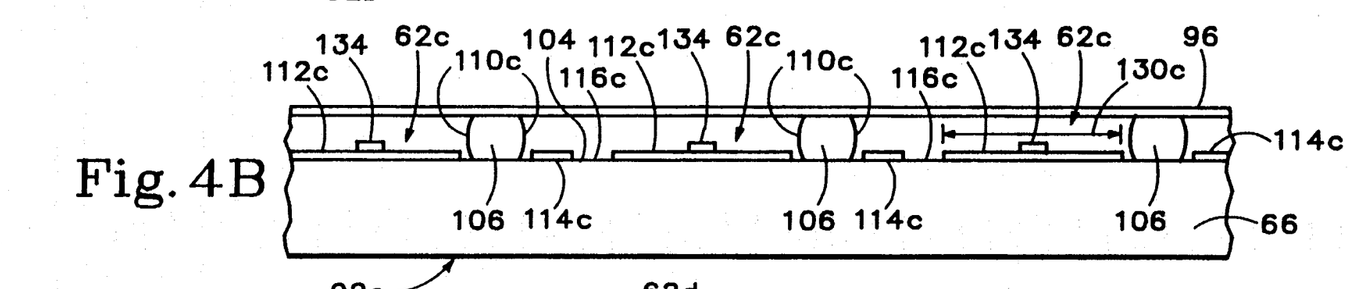
Figure 4C:
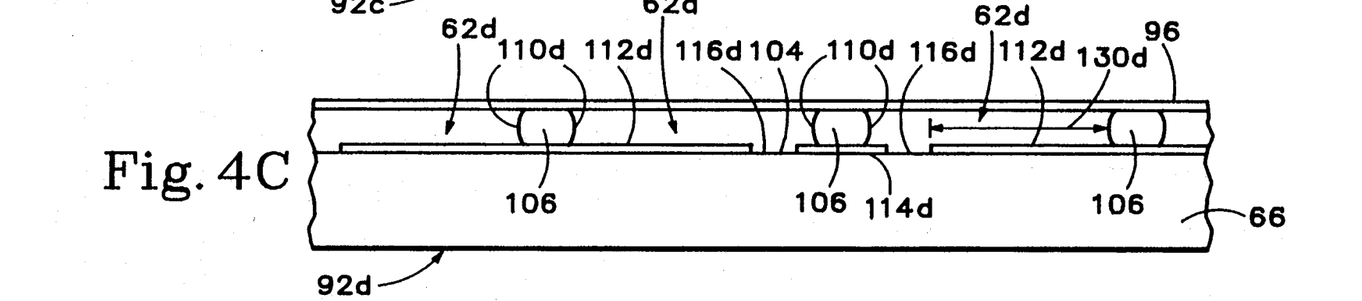

Electrode structure 92a includes substrate 66 on whose inner surface 104 multiple channels 62a are formed and aligned perpendicular to electrodes 60. Channels 62a are inscribed into inner surface 104 by photochemical etching to form a semi-circular cross section as shown in FIG. 3. FIGS. 4A, 4B, and 4C show alternative channels 62b, 62c, and 62d, respectively, formed in accordance with the present invention. Channels 62b are inscribed into inner surface 104 by photochemical etching to form a semi-oval cross section. Channels 62c and 62d are formed by bonding long, narrow glass fibers 106 to inner surface 104 to form the channels between fibers 106.

Channels 62a, 62b, 62c, and 62d have analogous associated structures that are identified by the same reference numeral with the respective suffices a, b, c, and d. For purposes of simplicity, the description of display system 50 refers primarily to channel 62a. It will be appreciated, however, that these descriptions are similarly applicable to channels 62b, 62c, and 62d.

Each one of the channels 62a has along its length a pair of inner side walls 110a and a pair of electrodes 112a and 114a positioned on a base or bottom surface 116a. Side walls 110a diverge as they extend away from bottom surfaces 116a to form channels 62a with semicircular cross sections and depths 118a. The sidewalls 110a between adjacent channels 62a define a plurality of support structures 120a with top surfaces 104 that support layer 96 of dielectric material. Adjacent ones of channels 62a are spaced apart by the width 124a of the top portion of each support structure 120a, width 124a defining the vertical space between next adjacent display elements 56 in a column. The overlapping regions of column electrodes 60 and channels 62a define the dimensions of display elements 56, which are shown in dashed lines in FIG. 3.

Electrodes 112a of channels 62a have an extended width 130a in accordance with the present invention and are connected to a common electrical reference potential that can be fixed at ground potential as shown. Electrodes 114a of channels 62a are connected to different ones of the output amplifiers 74 (of which three are shown in FIG. 3) of data strobe 76. (Electrodes 112a and 114a are hereinafter referred to as "reference electrodes 112a" and "row electrodes 114a," respectively.) Reference electrodes 112a and row electrodes 114a preferably are connected to the electrical reference potential and the outputs 74′ of data strobe 76, respectively, on opposite sides of display panel 52.

Each of channels 62a is filled with an ionizable gas, preferably one that includes helium. To address display elements 56 aligned with a channel 62a, the gas in the channel 62a is selectively ionized by a gas ionizing structure or arrangement that includes reference electrode 112a functioning as an anode and row electrode 114a functioning as a cathode.

The extended widths 130a of reference electrodes 112a provide each of channels 62a with a relatively large conductive surface area that facilitates the ionization of the gas contained therein. The large conductive surface areas provided by extended widths 130a of reference electrodes 112a overcome the quenching of the gas ionization caused by the nonconductive characteristics of sidewalls 110a and layer 96 of dielectric material, thereby maintaining the ionization of the gas.

Reference electrodes 112a with extended widths 130a and row electrodes 114a provide conductive surfaces that cover a substantial portion, at least about 70%, of bottom surfaces 116a, thereby covering about 35% of the interior surface of channels 62a (including the surface of layer 96 of dielectric material). This relatively large conductive surface is capable of maintaining ionization of a relatively small volume of gas. Accordingly, each channel 62a is formed with a relatively shallow depth 118a of between about 0.05 and 0.10 mm, which simplifies the manufacture of channels 62a and provides display panel 52 with enhanced viewing angle characteristics.

FIGS. 4B and 4C show reference electrodes 112c and 112d that are positioned in one and two channels, respectively. Each reference electrode 112c may be referred to as a uni-channel electrode, and each reference electrode 112d may be referred to as a bi-channel electrode. Reference electrode 112c is similar to electrodes 112a and 112b in that a separate reference electrode is contained within each channel. In contrast, reference electrode 112d is applied to inner surface 104 before fibers 106 are bonded thereto. As a result, channels 62d require the formation of one-half as many reference electrodes as are required for channels 62a, 62b, and 62c. As shown in FIG. 4C, row electrodes 114d may also be formed as bi-channel electrodes.

To ensure the proper operation of the display or memory system, it is important to ensure that unwanted ionized conditions are not created in the gas contained in the channels. To prevent such unwanted firing of the gas contained in an unselected channel in electrode structure 100, there are three conditions that should be met.

First, the gas in any channel can be ionized only at the proper moment in the scanning sequence. This condition pertains to preventing not only a misfiring of gas in an unselected channel by the presence of improper voltages on the channel electrodes but also a spurious misfiring of stored charge in an unselected channel.

Second, the duty cycles for the electrode drive signals applied to each channel electrode should be small and substantially constant as respects all of the electrodes driven, and the electrode drive signals should preferably return to a ground potential upon completion of the ionization of gas in a channel. The reason for a small, substantially constant duty cycle is that the drive signal voltages applied to the channel electrodes are capacitively coupled to the liquid crystal material affecting the voltage stored across it; therefore, drive signals with a longer duty cycle have a greater effect as a form of crosstalk on the stored voltage. The return to ground potential is preferable because superimposing or "floating" the data drive voltages on a nonground potential would otherwise be necessary to minimize crosstalk.

Third, the channel electrode drive signal voltages are preferably the same as or lower than those used to drive electrode structures in a unichannel configuration. This condition constrains the voltages to those of currently available drive circuits.

Figure 5:
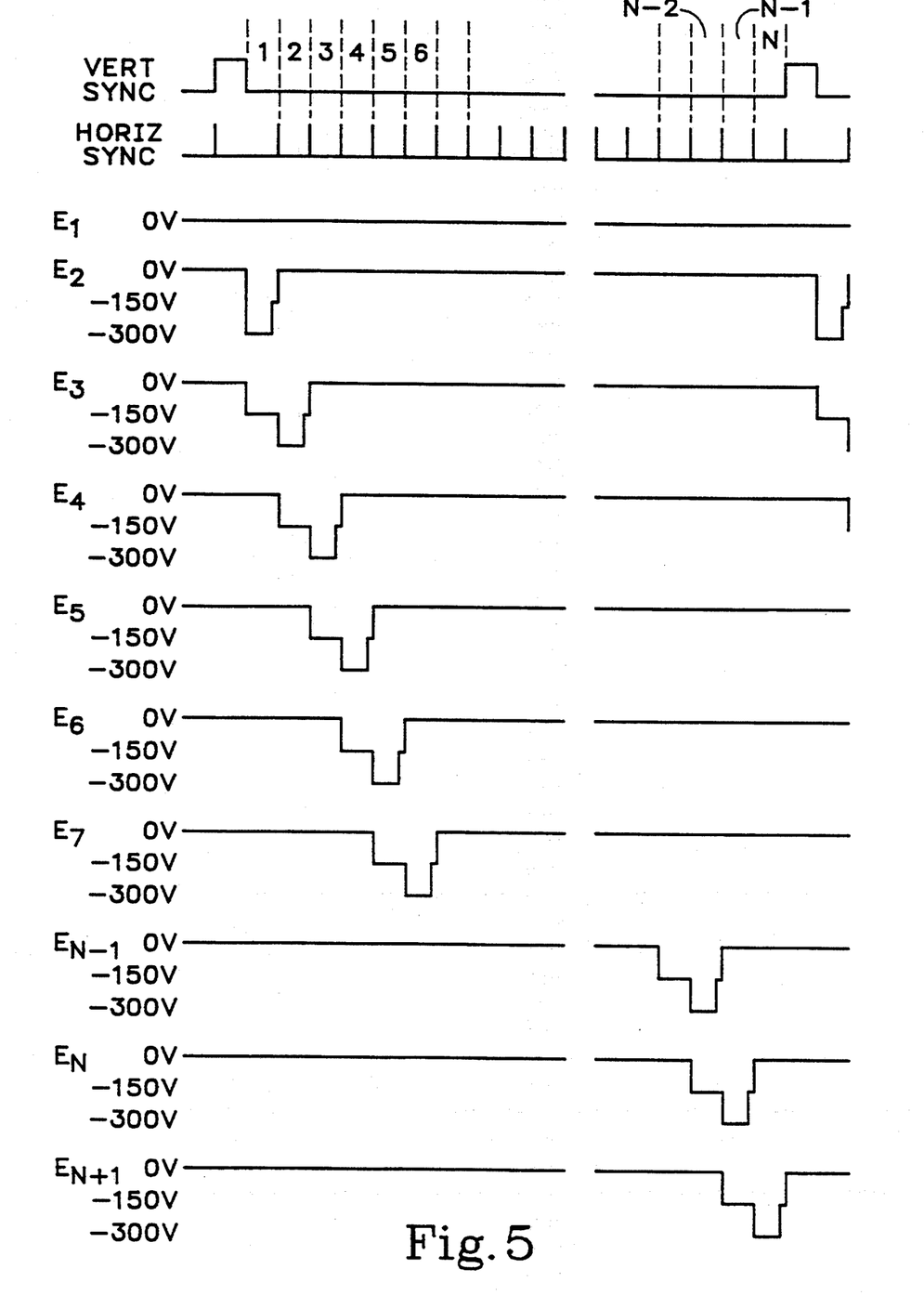
FIG. 5 is a timing diagram showing signal sequences for addressing successive rows of display elements in an addressing structure employing the electrode structure of FIG. 4C.

FIG. 5 is a timing diagram that shows the timing and voltage level relationships among the drive signals as the gas contained in the channels is selectively ionized in succession to accomplish a row scan operation of the bi-channel electrode structure of FIG. 4C. For purposes of clarity, FIG. 5 refers to output amplifiers $E_3$, $E_4$, $E_5$, $E_6$, and $E_7$ that drive respective common channel electrodes designated 3, 4, 5, 6, and 7 to indicate that channels 3, 4, 5, and 6 represent a nonspecific four-channel portion of the bi-channel electrode structure. For example, electrodes 3, 5, and 7 may be reference electrodes 112d and electrodes 4 and 6 may be row electrodes 114d.

In general, each of the output amplifiers delivers a drive signal voltage pulse in consecutive order to an electrode that is common to two adjacent channels. A vertical sync pulse starts a frame scan or selection operation of N number of channels, and a different one of N number of horizontal sync pulses ends the selection of each channel.

During the beginning of the selection of channel 3, the potential difference between the $E_3$ and $E_4$ signals applied to the respective electrodes 3 and 4 is 300 volts, which is sufficient to cause ionization of gas between electrodes 3 and 4 in channel 3. The potential difference is 150 volts between the $E_4$ and $E_5$ signals applied to the respective electrodes 4 and 5 and between the $E_5$ and $E_6$ signals applied to the respective electrodes 5 and 6, which potential difference is insufficient to either sustain or initiate a plasma ionization of gas in channels 4 and 5. Output amplifier $E_4$ imparts to the next to be selected channel (e.g., channel 4) a midpoint potential difference of 150 volts and acts as a buffer for the next to be selected channel from the full 300 volt potential difference. Near the conclusion of the selection of channel 3, the $E_4$ signal applied to electrode 4 increases to a −150 volt level, which shortens the ionization decay time.

During the beginning of the selection of channel 4, the $E_4$ signal applied to electrode 4 increases to ground potential and the $E_5$ signal applied to electrode 5 decreases to −300 volts, thereby developing a potential difference of 300 volts between electrodes 4 and 5 in channel 4 to ionize the gas contained in it. The $E_6$ drive signal applied to electrode 6 drops at this time to −150 volts to buffer the next to be selected channel (e.g., channel 5) from firing. The signals applied to the selected channel return to ground potential upon selection of the next to be selected channel and thus helps prevent the misfiring of any charge stored in the just previously selected channel.

FIG. 5 indicates that this process continues for each successive channel until N number of them have been selected. The process restarts upon receipt of another vertical sync pulse. FIG. 5 also shows that the $E_1$ and $E_2$ drive signals applied to the first two electrodes driven after the start of a scan operation differ from those sequentially applied to the remaining electrodes. The reason is that these electrodes are common to the first channel to be selected, which thus does not follow a previously fired adjacent channel.

Reference electrodes 112a–112d are preferably formed of an optically transparent conductive material such as indium tin oxide. The conductivity of such materials is, however, comparatively low. Accordingly, reference electrodes 112a–112d formed with a material such as indium tin oxide having respective widths 130a–130d may include a substantially narrower strip 134 (shown in FIG. 4B) of a highly conductive material such as metal applied on top of and in electrical contact with the indium tin oxide. Such a strip of material would improve the current-carrying capacity of electrodes 112a–112d.

The ionizable gas contained within each of the channels 62a operates as an electrical switch whose contact position changes between binary switching states as a function of the voltage applied by data strobe 76. The switches are connected between reference electrodes 112a and layer 68 of liquid crystal material. The absence of a strobe pulse allows the gas within the channels 62a to be in a nonionized, nonconducting state, thereby causing the ionizable gas to operate as an open switch. A strobe pulse applied to row electrode 114a is of a magnitude that causes the gas within the channel 62a to be in an ionized, conducting state, thereby causing the ionizable gas to operate as a closed switch.

More specifically, the ionizable gas contained within channels 62a beneath electrode structure 90 communicates with layer 96 of the dielectric material to provide an electrically conductive path from layer 96 to reference electrode 112a. The plasma in a channel 62a whose row electrode 114a receives a strobe pulse provides a ground path (i.e., a closed switch) to the portion of liquid crystal material positioned adjacent the plasma. This allows the liquid crystal material to sample the analog data voltages that are simultaneously applied to column electrodes 60. Extinguishing the plasma acts to remove the conducting path (i.e., an open switch), thereby allowing the data sample to be held across the display element. The voltages remain stored across layer 68 of the liquid crystal material until voltages representing a new line of data in a subsequent image field are developed across layer 68. The above-described addressing structure and technique provide signals of essentially 100% duty cycle to every one of the display elements 56.

Layer 96 of dielectric material functions as an isolating barrier between the ionizable gas contained within channel 62a and layer 68 of liquid crystal material. The absence of dielectric layer 96 would permit either the liquid crystal material to flow into the channel 62a or the ionizable gas to contaminate the liquid crystal material. However, dielectric layer 96 may be eliminated from displays that employ a solid or encapsulated electro-optic material.

It will be obvious to those having skill in the art that many changes may be made in the above-described details of the preferred embodiment of the present invention without departing from the underlying principles thereof. The scope of the present invention should, therefore, be determined only by the following claims.

We claim:

1. An addressing structure for a data element, comprising:
    an ionizable gaseous medium held in communication with the data element by a closed channel having a length and a bottom surface on which a reference electrode is positioned; and
    ionizing means providing a data strobe signal to a data strobe electrode positioned on the bottom surface of the channel adjacent to the reference electrode for selectively effecting ionization of the ionizable gaseous medium to provide an interruptible electrical connection between the data element and the reference electrode and thereby selectively address the data element, the reference electrode and the data strobe electrode extending along the length of the channel and having respective first and second widths transverse to the length, the first width being substantially greater than the second width.

2. The addressing structure of claim 1 in which each data element functions as a display element of a display system.

3. The addressing structure of claim 1 in which the channel is of relatively shallow depth.

4. The structure of claim 1 in which the reference electrode includes an optically transparent material of the first width extending along the length of the substrate channel.

5. The structure of claim 4 in which the optically transparent material has a relatively low conductivity and the reference electrode further includes a strip of highly conductive, optically opaque material in electrical contact with the optically transparent material and having a width substantially less than the first width.

6. The addressing structure of claim 1 in which the reference electrode and the data strobe electrode cover at least 70 percent of the bottom surface of the channel.

7. In a data element addressing structure having an ionizable gaseous medium captured within plural side-by-side closed channels, each of which has a bottom surface and a length and is in communication with a data element, the improvement comprising:
    an ionizing electrode structure including a reference electrode and a data strobe electrode positioned on the bottom surface and extending along the length of each channel and having respective first and second widths transverse to the length of the substrate channel, the first width being substantially greater than the second width, the reference electrode and the data strobe electrode of each channel being adapted to receive signals that effect ionization of the ionizable gaseous medium to selectively address the data element in communication with the substrate channel.

8. The addressing structure of claim 7 in which each substrate channel includes a separate reference electrode.

9. The addressing structure of claim 7 in which adjacent pairs of the substrate channels have common reference electrodes and common data strobe electrodes.

10. The addressing structure of claim 7 in which adjacent substrate channels are formed on a nonconductive substrate and are separated by support structures that include narrow nonconductive fibers bonded to the substrate.

11. The addressing structure of claim 7 in which the reference electrode includes an optically transparent material of the first width extending along the length of the channel.

12. The addressing structure of claim 11 in which the optically transparent material has a relatively low conductivity and the reference electrode further includes a substantially narrower strip of conductive, optically opaque material in electrical contact with the optically transparent material.

13. The addressing structure of claim 8 in which each channel has a semi-oval cross section.

14. The addressing structure of claim 7 in which a reference electrode and a data strobe electrode cover at least 70 percent of the bottom surface of each channel.

15. An electro-optic display panel with a row of display elements, comprising:
    an ionizable gaseous medium held in communication with the row of display elements by a closed channel having a length and a bottom surface along which a reference electrode is positioned;
    ionizing means providing a data strobe signal to a data strobe electrode positioned on the bottom surface of the channel adjacent to the reference electrode for selectively effecting ionization of the ionizable gaseous medium to provide an interruptible electrical connection between the row of display elements and the electrical reference and thereby selectively addressing the row of display elements, the reference electrode and the data strobe electrode extending along the length of the channel and having respective first and second widths transverse to the length of the channel the first width being substantially greater than the second width; and a layer of electro-optic material aligned with the row of display elements for receiving display data when the row of display elements is addressed by the ionizing means.

16. The display panel of claim 15 in which the reference electrode and the data strobe electrode cover at least 70 percent of the bottom surface of the channel.

17. An electro-optic display panel with a row of display elements, comprising:

an ionizable gaseous medium held in communication with the row of display elements by a closed channel having a length and a bottom surface along which a reference electrode is positioned:

ionizing means providing a data strobe signal to a data strobe electrode positioned on the bottom surface of the channel adjacent to the reference electrode for selectively effecting ionization of the ionizable gaseous medium to provide an interruptible electrical connection between the row of display elements and the electrical reference and thereby selectively addressing the row of display elements, the reference electrode including an optically transparent material with relatively low conductivity and having a first width transverse to the length of the channel and a substantially narrower strip of conductive, optically opaque material in electrical contact with the optically transparent material; and a layer of electro-optic material aligned with the row of display elements for receiving display data when the row of display elements is addressed by the ionizing means.

18. The display panel of claim 15 in which the substrate channel is of relatively shallow depth.

19. The display panel of claim 17 in which the data strobe electrode has a second width transverse to the length of the channel and the first width of the optically transparent material of the reference electrode is substantially greater than the second width.

20. The addressing structure of claim 17 in which the channel is of relatively shallow depth.

* * * * *